H. W. HOLMAN.
Dried Fruit Looseners.

No. 144,542.                    Patented Nov. 11, 1873.

Witnesses.
E. P. Bates
George E. Upham.

Inventor.
Harry W. Holman.
Chipman Hosmer & Co.
Attorneys.

UNITED STATES PATENT OFFICE.

HARRY W. HOLMAN, OF WATERLOO, IOWA.

IMPROVEMENT IN DRIED-FRUIT LOOSENERS.

Specification forming part of Letters Patent No. 144,542, dated November 11, 1873; application filed August 16, 1873.

*To all whom it may concern:*

Be it known that I, HARRY W. HOLMAN, of Waterloo, in the county of Black Hawk and State of Iowa, have invented a new and valuable Improvement in Dried-Fruit Looseners; and I do hereby declare that the following is a full, clear, and exact description of the construction and operation of the same, reference being had to the annexed drawings making a part of this specification, and to the letters and figures of reference marked thereon.

Figure 1:
Figure 2:
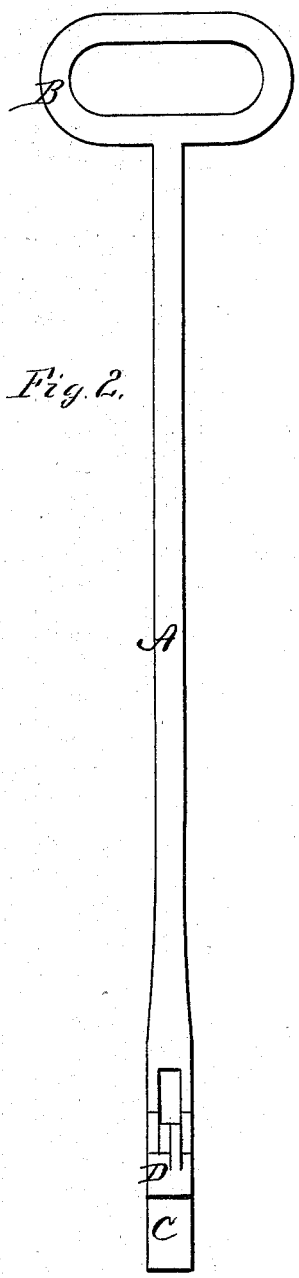
Figure 3:

Figure 1 of the drawings is a representation of my instrument, partly in section. Fig. 2 is an edge view, and Fig. 3 is a side view, of the same.

The object of my invention is to furnish a cheap, simple, and durable instrument for loosening dried fruit which is packed in barrels, kegs, or other packages; and it consists in curved wings, pivoted in a slotted spear-shaped point, so arranged that while the instrument is being inserted in the dried fruit the wings are closed, but the force applied to pull it out will spread the wings.

Like letters of reference indicate corresponding parts.

A represents a steel shaft, of any suitable length, made with a handle, B, at one end. At the other end is formed a spear-shaped point, C, which is slotted or mortised through, as shown in Fig. 1. In this slot or mortise are hinged or pivoted two curved wings, D D, which extend one on each side, and open downward, as shown in Fig. 1.

When this instrument is forced into the solidly-packed dried fruit, these wings close upward; but as soon as any force is applied to pull the instrument out, the points of the wings catching on the fruit will cause them to spread or expand, and thus loosen the fruit as the instrument is pulled out.

What I claim as new, and desire to secure by Letters Patent, is—

The device for loosening dried fruit, having its wings D D pivoted at their inner ends, projecting outward and downward when open, and curved upward and outward when folded, in connection with the shouldered spear-shaped point C and shaft A, substantially for the purposes mentioned.

In testimony that I claim the above I have hereunto subscribed my name in the presence of two witnesses.

HARRY W. HOLMAN.

Witnesses:
    WM. GALLOWAY,
    H. L. WHITE.